(12) United States Patent
Chao

(10) Patent No.: US 7,792,635 B2
(45) Date of Patent: Sep. 7, 2010

(54) MULTI-FUNCTION NAVIGATION SYSTEM

(75) Inventor: Pi-Chun Chao, Taipei (TW)

(73) Assignee: Mitac International Corp., Taoyuan (TW)

(*) Notice: Subject to any disclaimer, the term of this patent is extended or adjusted under 35 U.S.C. 154(b) by 959 days.

(21) Appl. No.: 11/262,776

(22) Filed: Nov. 1, 2005

(65) Prior Publication Data

US 2006/0095201 A1    May 4, 2006

(30) Foreign Application Priority Data

Nov. 2, 2004    (TW) .............................. 93133371 A

(51) Int. Cl.
*G01C 21/00* (2006.01)
(52) U.S. Cl. .................... 701/200; 701/1; 701/213; 701/215; 340/989; 340/994; 340/995.16
(58) Field of Classification Search ................ 701/200, 701/201, 206, 207, 208, 209, 211, 213; 340/988–995.28
See application file for complete search history.

(56) References Cited

U.S. PATENT DOCUMENTS

| 6,839,628 | B1 * | 1/2005 | Tu ............................. 701/209 |
| 7,155,339 | B2 * | 12/2006 | Tu ............................. 701/209 |
| 7,158,878 | B2 * | 1/2007 | Rasmussen et al. ......... 701/208 |
| 2002/0047787 | A1 * | 4/2002 | Mikkola et al. ............. 340/995 |
| 2002/0133292 | A1 * | 9/2002 | Miyaki ....................... 701/209 |
| 2003/0167120 | A1 * | 9/2003 | Kawasaki ................... 701/209 |
| 2004/0066330 | A1 * | 4/2004 | Knockeart et al. ..... 342/357.07 |
| 2004/0204821 | A1 * | 10/2004 | Tu ............................. 701/200 |
| 2004/0259573 | A1 * | 12/2004 | Cheng ..................... 455/456.3 |
| 2005/0038599 | A1 * | 2/2005 | Lehmann et al. ........... 701/208 |
| 2005/0085999 | A1 * | 4/2005 | Onishi ........................ 701/211 |
| 2005/0251331 | A1 * | 11/2005 | Kreft .......................... 701/207 |
| 2005/0261822 | A1 * | 11/2005 | Wako ......................... 701/200 |

\* cited by examiner

*Primary Examiner*—Khoi Tran
*Assistant Examiner*—Nikhil Sriraman
(74) *Attorney, Agent, or Firm*—Rabin & Berdo, P.C.

(57) ABSTRACT

A multi-function navigation system provides an electronic map to guide the user to destinations and provides information of scenic spots stored in an electronic book. The navigation system includes: a scenic spot information searching module for searching scenic spots within the selected scope of electronic map and identifying the scenic spots included in the electronic book; a traveling information note module for providing a interface to the electronic book of the scenic spots including the electronic book; and a display module for displaying the electronic map and marks of the interface linking to the electronic book of the scenic spots.

8 Claims, 5 Drawing Sheets

| Regions | Name of spot | Coordinate (X,Y) | Correlative electronic book information? | Reference parameters of traveling information |
|---|---|---|---|---|
| Taipei county | Empire temple | Xa,Ya | YES(1) | 0x1BD |
| Taipei city | Sun-yi-sen memorial hall | Xn,Yn | No(0) | 0x00 |
| Taitung county | Golden pin mountain | Xm,Ym | YES(1) | 0x53 |
| ... | ... | ... | ... | ... |

FIG. 2

| Region | Name of spot | Coordinate(X,Y) | Reference parameter | Content | Picture | Others |
|---|---|---|---|---|---|---|
| Taipei county | Empire temple | Xa,Ya | 0x1BD | . . . | . . . | . . . |
| Taipei city | Sun-yi-sen memorial hall | Xn,Yn | 0x00 | . . . | . . . | . . . |
| Taitung county | Golden pin mountain | Xm,Ym | 0x53 | . . . | . . . | . . . |
| . . . | . . . | . . . | . . . | | | |

FIG. 3

MULTI-FUNCTION NAVIGATION SYSTEM

CROSS REFERENCE TO RELATED APPLICATION

This non-provisional application is based upon and claims the benefit of priority from the prior Taiwan Patent Application No. 93133371, filed on Nov. 2, 2004, the entire contents of which are incorporated herein by reference.

FIELD OF THE INVENTION

The invention generally relates to a navigation system and method, and in particular relates to a navigation system and method including multiple functions of electronic books.

BACKGROUND OF THE INVENTION

As prosperity of traveling activities, popularity of electronic products and promotions of businesspersons, more and more consumers start to use the satellite navigational system, i.e., the GPS or global positioning system. As long as inputting a reference coordinate to the device, the user can arrive at the destination under the GPS's assistance. A common marketed vehicular guidance system usually provides some interesting scenic spots directly on the map. A better system may provide some further information of the scenic spots, for example the contact phone number, the address, the website, the business hour, the lowest expense and so on. However, the information related to the scenic spots and the functions are still limited. In addition, the user is unable to get more traveling information. Therefore, when using the satellite navigational system to inquire routes or scenic spots, the information contents are insufficient. Some information, such as the historical background or a picture of the spot, is not available.

On the other hand, there are publishers who release "GPS Traveling Guides". The users can get traveling and positioning information from the books. The reference coordinates provided from the book are input to the navigation system of a GPS device by the user, such that the spots that the user wants to go can be quickly obtained under the GPS help.

In view of the above, a combination package including a GPS traveling guide and a GPS device is provided, which is capable of convenience for the users.

However, as described above, the information related to the scenic spots from the map provided by the GPS device is extremely limited. If accompanying with books, the user first has to look up the reference coordinate of the destination in the books and then input the coordinate to the navigation system of the GPS device. This shows not only inconvenient operation, but also enhances the danger of driving.

SUMMARY OF THE INVENTION

Accordingly, a multi-function navigation system that combines the advantages of traveling information and a navigation device is provided, so as to enable the user getting information stored in an electronic book. Moreover, the coordinates of traveling spots from the related electronic book can be directly transferred to the navigation system. Thus, the guiding path to the scenic spot is displayed in real time.

On the other hand, when the user browses the electronic map of the navigation system, he or she can identify easily through different display appearance if a scenic spot includes further electronic book information. Therefore, the user can choose the spot, or through a pull-down menu, to link to the related contents of the electronic book for more information.

In one aspect, a multi-function navigation system of the invention provides an electronic map to guide the user to destinations and information of scenic spots through an electronic book. The multi-function navigation system includes:

an input module for receiving instructions by the user;

a position detecting module for detecting the present position of the user;

an electronic map databank for storing the electronic map including related data.

The electronic map including a message for defining coordinates of scenic spots, message showing whether or not electronic book information exists, and the reference parameters of traveling information of the scenic spots;

a path selection module for selecting an area from the electronic map from the electronic map databank according to the user's present position and controls of the input device;

a scenic spot information searching module for searching scenic spots within the area of electronic map and picking up specific scenic spots shown in the electronic book information;

a traveling information note module for providing an interface connected to the electronic book information of the scenic spots that are identified of including electronic book information;

a display module for displaying the electronic map and the electronic map includes marks of the interface linking the electronic book with specific scenic spots;

an electronic book databank for storing electronic book information of the scenic spots. The electronic book data also includes the reference parameters of traveling information of the scenic spots;

a scenic spot information obtaining module for obtaining correspondent electronic book information according to the control of the input module and the comparison of reference parameters of traveling information of scenic spots in the electronic book databank; and a scenic spot guidance supplement module for providing navigation linking interface marks to the scenic spots according to the electronic book information obtained by the scenic spot information obtaining module, and displaying through the display module.

On the other hand, a guidance method of the invention includes steps of:

displaying electronic book information of scenic spots. The electronic book information includes marks of the interface linking to navigation; and providing a guiding path according to the coordinate of scenic spot by the electronic book information and the present position of the user.

Further, the invention provides a method for showing electronic book information through an electronic map. The method includes steps of:

displaying a suitable scope of electronic map based on present position of the user;

confirming the scenic spots in the electronic map scope;

confirming whether the scenic spots falling in the electronic map scope include electronic book information; and displaying linking interface marks on scenic spots that include electronic book information.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

BRIEF DESCRIPTION OF THE DRAWINGS

The above and other objects, features and other advantages of the invention will be more clearly understood from the following detailed description when taken in conjunction with the accompanying drawings, in which:

FIG. 2 and FIG. 3 are data fields defined and established in the electronic map databank and in the electronic book databank respectively;

DETAILED DESCRIPTION OF THE INVENTION

Figure 1:
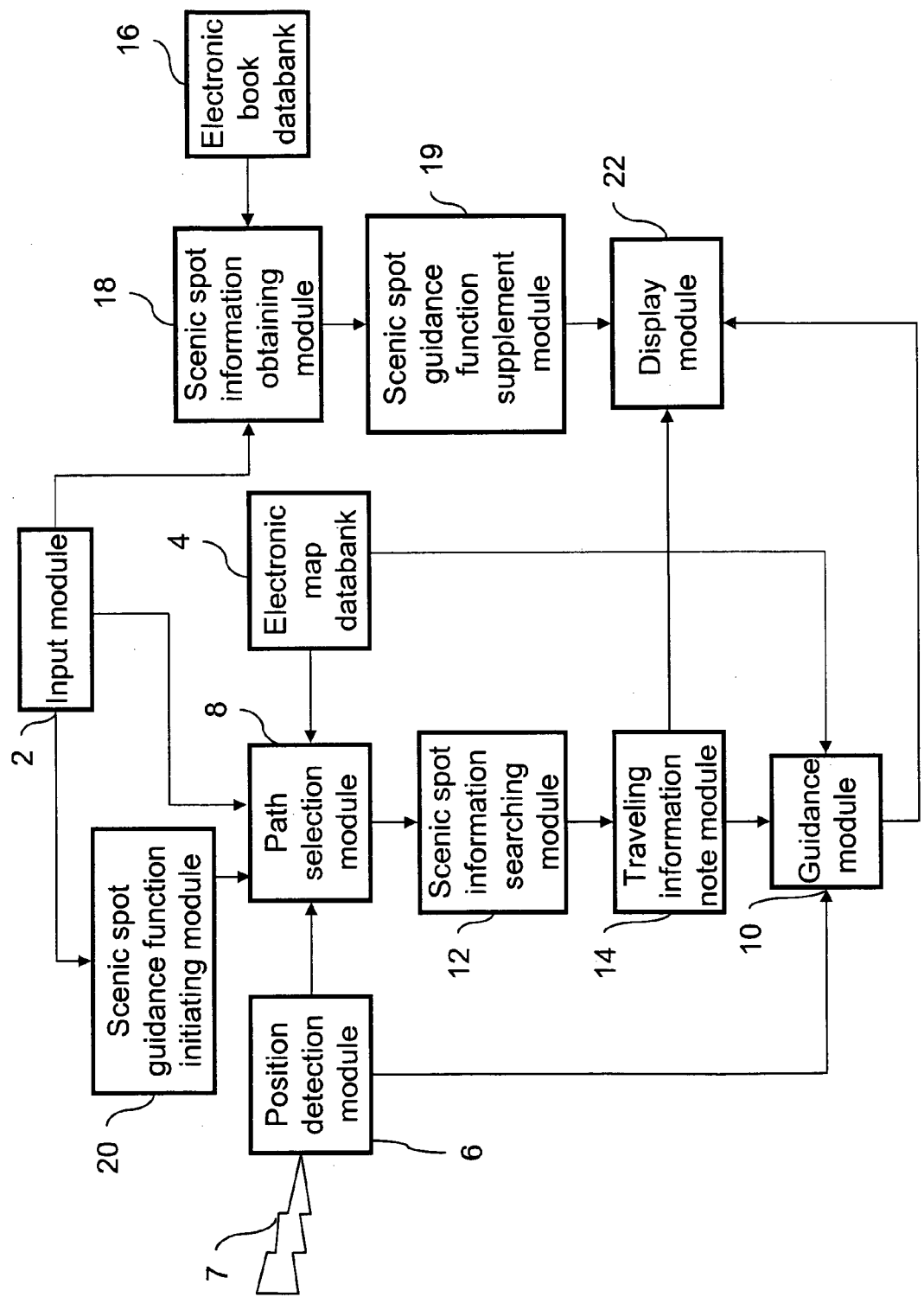
FIG. 1 is a block diagram of a multi-function navigation system of the invention.

Reference will now be made in greater detail to an embodiment of the invention, an example of which is illustrated in the accompanying drawings. Wherever possible, the same reference numerals are used throughout the drawings and the description to refer to the same or like parts. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As shown in FIG. 1, a multi-function navigation system of the invention is capable of displaying electronic map to guide the user from his or her present position to a destination. The invention can be installed in an automobile, or can be installed to a portable electronic device, such as PDA, Palm, mobile phone, notebook computer and so on, for providing various functions. Except the basic navigation and electronic book traveling information functions, the system also provides the functions of street intersection automated enlargement and prompt, over-speed photograph crackdown alarm, path plan, schedule plan, web-browsing, email receiving and sending, mobile phone and so on.

The characteristic of the invention is that the multi-function navigation system can provide linking between an electronic map and an electronic book, so as to help users getting navigation function directly from the electronic book, and linking and displaying the electronic book information directly from the electronic map provided by the navigation system.

The navigation system includes an input module 2, an electronic map databank 4, a position detection module 6, a path selection module 8, a guidance module 10, a scenic spot information searching module 12, a traveling information note module 14, an electronic book databank 16, a scenic spot information obtaining module 18, a scenic spot guidance function supplement module 19, a scenic spot guidance function initiating module 20 and a display module 22.

The input module 2 is provided for user to choose and input operation commands. The input module 2 can be a remote controller, touch panel, keyboard, mouse or other similar human interface. Therefore, the user can choose start and target locations, zoom in, zoom out or shift the map, choose scenic spots on the map and link to the electronic book and operate the pull-down menu on the scenic spots, etc.

The electronic map databank 4 includes storage means, such as optical disc (CD or DVD), hard disk, memory card or other similar storage media, for storing data related to the scenic spots the electronic map. The electronic map databank 4 includes data fields of geographical information, such as configuration, name of roads, intersections, coordinates and so on. As shown in FIG. 2, the electronic map databank 4 defines information related to scenic spots, such as administrative regions, names of the spots, coordinates, message showing whether or not electronic book information exists, and the reference parameters of traveling information of the scenic spots.

The position detection module 6 is mainly a global positioning system (GPS) to receive satellite signals 7 and determine the present position of the vehicle or the user. The position information is then provided to the path selection module 8 and the guidance module 10. The path selection module 8 fetches required scope from the electronic map databank 4 according to the information provided by the position detection module 6. The path selection module 8 determines a start location, a target location and a guidance path according to spot navigation instructions of the scenic spot guidance function initiating module 20 or the input module 2. The guidance module 10 generates a corresponding image to be displayed through the display module 22 after receiving aforesaid information of guidance path, present position and the selected scope of electronic map.

The scenic spot information searching module 12 searches scenic spots within the scope of electronic map selected by the path selection module 8 from the electronic map databank 4 and identifies the scenic spots on the map that include electronic book information.

The traveling information note module 14 provides an information-linking mark and interface connected to the electronic book information of the scenic spots that are identified of including electronic book information (logically true "1" of judgment). The mark and interface can be an icon, different color or word of "information" or "electronic book" on the scenic spot, and displayed by the display module 22.

The electronic book databank 16 includes storage means, such as optical disc (CD or DVD), hard disk, memory card or other similar storage media, for storing electronic book information of the scenic spots. The electronic book data include traveling information and reference parameters of the scenic spots. As shown in FIG. 3, there are data fields of administrative region, name of spot, coordinate, reference parameter, content, picture and so on.

The scenic spot information obtaining module 18 obtains correspondent electronic book information according to the control of the input module 2 and the comparison of reference parameters of traveling information of scenic spots in the electronic book databank 16. The information is then passed to the display module 22.

The scenic spot guidance supplement module 19 provides navigation-linking interface marks or a text to the scenic spots according to the electronic book information obtained by the scenic spot information obtaining module 18, and displays them through the display module 22. The user can choose the mark, text or a pull-down menu on the scenic spot to get functions of "viewing the map", "new favorite" and "navigation".

The scenic spot guidance function initiating module 20 provides coordinates of the scenic spot to the path selection module 8 and starts guiding function when the user operates the input module 2 to choose the navigation mark, text or the pull-down menu on or aside the scenic spots.

The display module 22 in the embodiment is a liquid-crystal display to display the image. Certainly, other kinds of display, such as CRT or plasma display, can achieve the same function.

Therefore, when browsing the map, the user is noted of the scenic spots that have electronic book information. Then, the user can directly choose the "book" mark, text or pull-down menu on or aside the scenic spot to get the electronic book information.

On the other hand, when browsing the electronic book, the user can directly choose the "map" mark or the pull-down menu related to the scenic spot to get the guidance function.

An embodiment of navigation method of the invention is further described below.

Figure 4:
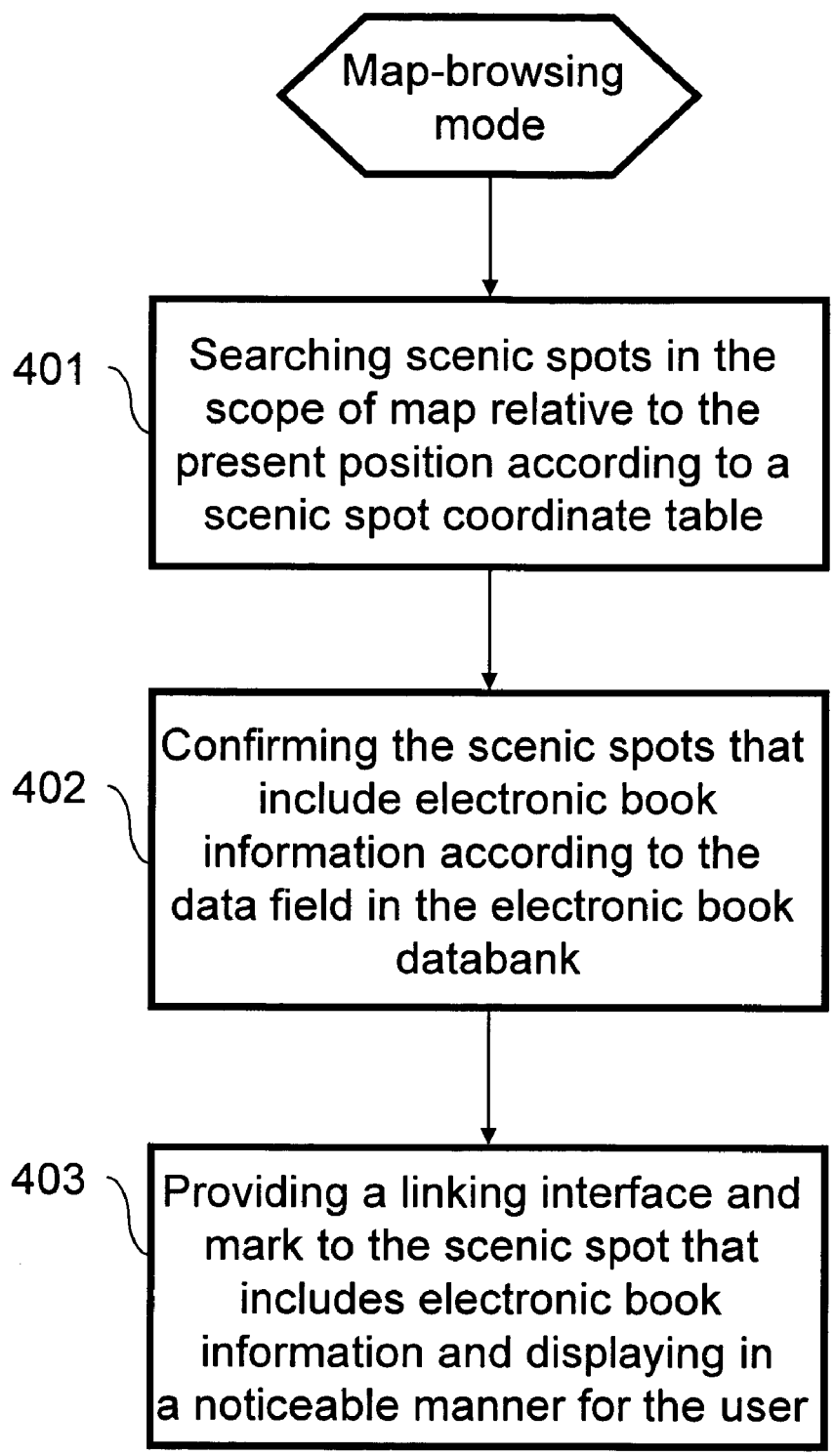
FIG. 4 is a flowchart of a multi-function navigation method of the invention, in which electronic book information is linkable from the scenic spots in the electronic map.

Please refer to FIG. 4, which is a flowchart of a multi-function navigation method of the invention in which electronic book information is linkable from the scenic spots in the electronic map.

First, in the map-browsing mode, the navigation system searches the scenic spots in the scope of map relative to the present position according to a scenic spot coordinate table (step 401). Displaying the scenic spots and confirming the scenic spots that include electronic book information according to the data field in the electronic book databank 16 that defines whether the electronic book information exists (step 402).

If a scenic spot includes electronic book information in the electronic book databank 16, then a linking interface and mark to the electronic book information is provided to the scenic spot for noticing the users (step 403). For example, a different display icon or color of the scenic spot is displayed. Then, linking to the electronic book databank 16 when the user operating a pull-down menu, choosing the spot or through other simple interfaces.

When receiving an "information" request of the user, the system searches the corresponding content of the scenic spot according to the relative traveling content parameter in the electronic book databank.

On the contrary, if a scenic spot does not include electronic book information in the electronic book databank 16, then no specific mark, color or linking will be displayed with the scenic spot. So, the user can notice that there is no traveling information related to the scenic spot.

Moreover, no matter the scenic spot on the map including traveling information or not, the scenic spot icon itself or the neighbor provides a function for the user to directly choose and start the navigation mode.

Figure 5:
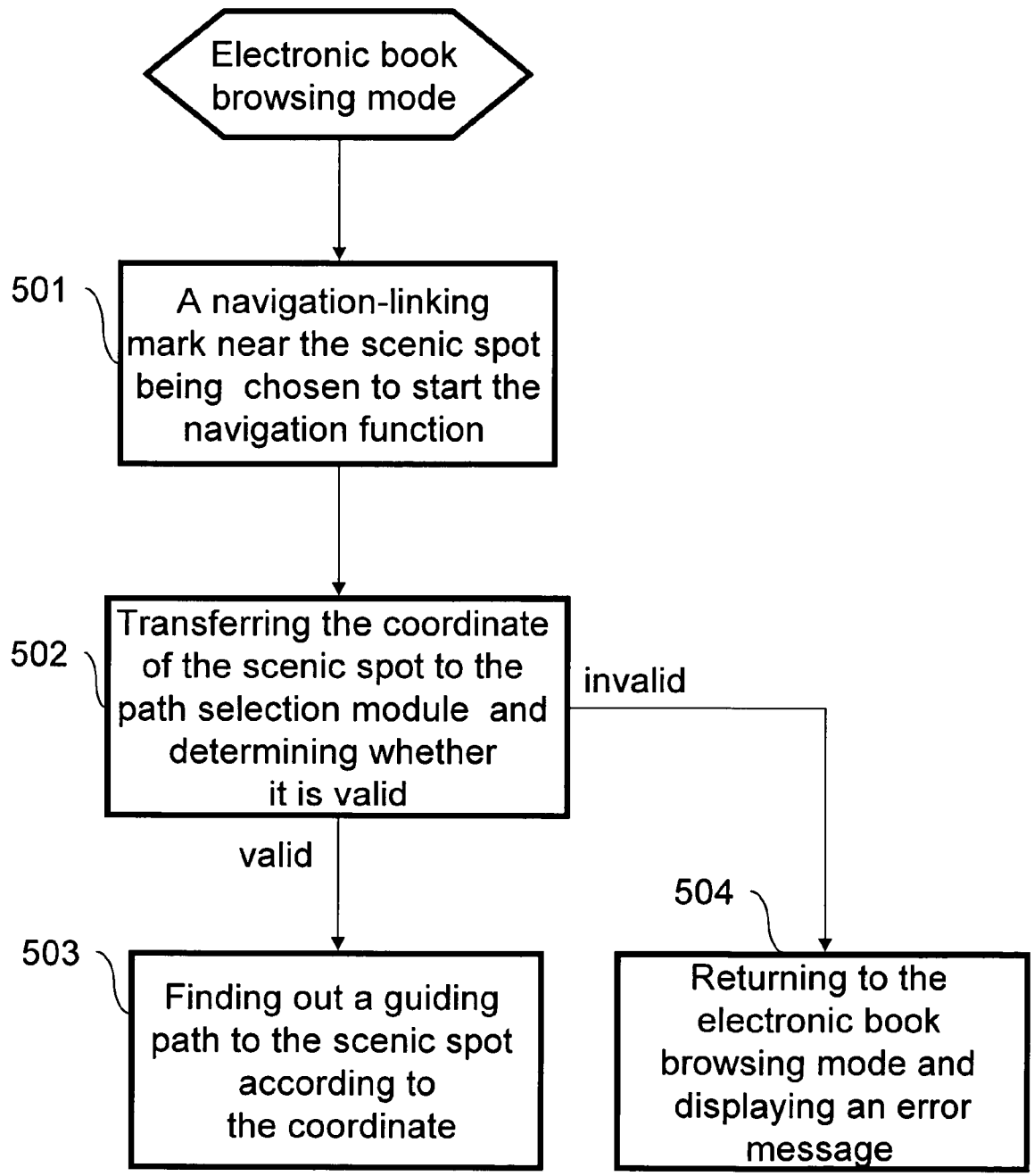
FIG. 5 is a flowchart of a multi-function navigation method of the invention, in which a navigation request is made directly from scenic spots in the electronic book.

Please refer to FIG. 5, which is a flowchart of a multi-function navigation method of the invention in which a navigation inquiry is made directly from scenic spots in the electronic book.

First, in the electronic book browsing mode, a navigation-linking mark near the scenic spot is provided for the user to choose and start the navigation function (step 501). When the spot is chosen, the coordinate of the scenic spot is automatically transferred to the path selection module 8. The path selection module 8 judges whether it is a valid coordinate (step 502).

When the coordinate is valid, the guiding path to the scenic spot is found out according to the coordinate (step 503).

When the coordinate is invalid, the process returns to the electronic book browsing mode and displays an error message (step 504).

For further description, please refer to FIG. 2 and FIG. 3, FIG. 2 and FIG. 3 are data fields defined and established in the electronic map databank 4 and in the electronic book databank 16 respectively.

In the electronic map databank 4, each scenic spot includes data fields of administrative regions, names of spots, coordinates, message showing whether or not electronic book information exists, and reference parameters of traveling information of the scenic spots and so on.

The characteristics are that it contains the field of "whether the electronic book information exists" and "traveling information parameters". The scenic spot information searching module 12 is informed by the field of "whether the electronic book information exists" whether or not to find the electronic book information of the scenic spot. The system is informed by the field of traveling information parameters to get the scenic spot information in the electronic book databank 16. According to the information, the system can quickly find out and display the scenic spot information in the electronic book databank 16.

Moreover, the fields of administrative region and the name of the spot give regional name of county or city where the scenic spot locates and the name of the spot. The field of coordinate provides data for the path guidance and the related position display.

In the electronic book information bank 16, each scenic spot includes data fields of administrative regions, names of the spots, coordinates, traveling information parameters, information content, picture and so on.

The characteristics are that each scenic spot includes data fields of traveling information parameters and the coordinates. The traveling information parameters are similar to that in the electronic map databank 4 for helping the scenic spot information obtaining module 18 to find out the scenic spot information from the electronic book databank 16. The scenic spot information includes telephone number, address, website, business hour, the lowest expense amount, scenery pictures and so on.

The coordinate field provides data for the path selection module 8 to select a guidance path when the user inquiring a guidance to the scenic spot. Then, there is no need for the user to input coordinates manually.

Similar, the fields of administrative region and name of spot give regional name of county or city where the scenic spot locates and the name of the spot.

In the embodiment described above, the user chooses guidance function directly from the electronic book. However, it is also applicable using a pull-down menu to add new favorite or to start navigation function. Certainly, the basic manual input of coordinate of the scenic spot to carry on the guidance function is also applicable.

As described above, the invention combines the advantages of full traveling information of electronic books and the convenience of navigation system to let the user notice which scenic spot on the map includes electronic book information. The user can directly choose the scenic spot icon itself, "book" or "information" mark or through a pull-down menu to choose the list and get the electronic book information. On the other hand, when browsing the electronic book, the user may directly start navigation function for a scenic spot through a "map" or "navigation" icon or a pull-down menu.

Therefore, the invention solves the problems of insufficient contents for scenic spots provided by conventional navigation system and the inconvenience of searching books and typing target coordinates for navigation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-function navigation system configured to provide an electronic map to guide a user to a destination and display information of scenic spots stored in an electronic book, comprising:
   an input module configured to receive instructions of said user;
   a position detecting module configured to detect a present position of said user;
   an electronic map databank configured to store data of said electronic map, said data of said electronic map including a first message to define coordinates of scenic spots, a second message to define whether or not electronic book information for said scenic spots exists in an electronic book, and a third message to define reference parameters of traveling information of said scenic spots;
   a path selection module configured to select an area of an electronic map from said electronic map databank according to said user's present position and controls of said input module;
   a scenic spot information searching module configured to search scenic spots within said area of said electronic map and identify scenic spots whose said electronic book information exists in said electronic book from among said searched scenic spots;
   a traveling information note module configured to provide information-linking interfaces, said information-linking interfaces linking said data of said electronic map related to said identified scenic spots and said respective electronic book information; and
   a display module configured to display said area of said electronic map and marks of said scenic spots attached with said respective information-linking interfaces to said area.

2. The multi-function navigation system of claim 1 further comprising:
   an electronic book databank configured to store the electronic book information of said scenic spots, said electronic book information including a message to define said reference parameters of said traveling information of said scenic spots the same as said third message to define said reference parameters of said traveling information of said scenic spots;
   a scenic spot information obtaining module configured to obtain said corresponding electronic book information according to control of said input module and comparison of said third message to define said reference parameters of said traveling information of said scenic spots stored in said electronic book databank; and
   a scenic spot guidance supplement module configured to provide a navigation-linking interface to be attached to each of said marks of said scenic spots according to said electronic book information obtained by said scenic spot information obtaining module;
   wherein each of said navigation-linking interfaces is used to start a navigation function related to said corresponding scenic spot; and
   wherein said marks of said scenic spots attached to said respective navigation-linking interfaces are displayed by said display module.

3. The multi-function navigation system of claim 2 wherein said scenic spot guidance supplement module further provides navigation-linking interfaces attached to said electronic book information of said scenic spots in said electronic book, and marks of said navigation-linking interface and said electronic book information of said scenic spots are displayed together by said display module.

4. The multi-function navigation system of claim 2 wherein said electronic book databank comprises data fields of administrative regions, names of spots, coordinates, reference parameters, contents and figures for said scenic spots.

5. The multi-function navigation system of claim 1 wherein said traveling information note module provides recognizable marks to said scenic spots in said electronic book.

6. The multi-function navigation system of claim 5 wherein said recognizable marks of scenic spots are displayed by different color.

7. The multi-function navigation system of claim 1 wherein said position detecting module is a global positioning system device.

8. The multi-function navigation system of claim 1 wherein said electronic map databank comprises data fields of administrative regions, names of spots, and coordinates.

* * * * *